United States Patent
Pugh et al.

(10) Patent No.: US 10,023,689 B2
(45) Date of Patent: Jul. 17, 2018

(54) FUNCTIONAL BIODEGRADABLE POLYMERS

(71) Applicants: Coleen Pugh, Akron, OH (US);
Abhishek Banerjee, Akron, OH (US);
William Storms, Akron, OH (US);
Colin Wright, Kingwood, TX (US)

(72) Inventors: Coleen Pugh, Akron, OH (US);
Abhishek Banerjee, Akron, OH (US);
William Storms, Akron, OH (US);
Colin Wright, Kingwood, TX (US)

(73) Assignee: The University of Akron, Akron ( * ) Notice: Subject to any disclaimer, the term of this patent is extended or adjusted under 35 U.S.C. 154(b) by 0 days.

(21) Appl. No.: 15/132,430

(22) Filed: Apr. 19, 2016

(65) Prior Publication Data

US 2016/0229952 A1    Aug. 11, 2016

Related U.S. Application Data

(63) Continuation of application No. 13/812,604, filed as application No. PCT/US2011/001333 on Jul. 28, 2011.

(60) Provisional application No. 61/368,413, filed on Jul. 28, 2010.

(51) Int. Cl.
C08G 63/06 (2006.01)
C08G 63/682 (2006.01)
C08G 63/60 (2006.01)
C08G 63/91 (2006.01)

(52) U.S. Cl.
CPC ........ *C08G 63/6822* (2013.01); *C08G 63/06* (2013.01); *C08G 63/60* (2013.01); *C08G 63/912* (2013.01); *C08G 63/914* (2013.01); *C08G 2230/00* (2013.01)

(58) Field of Classification Search
None
See application file for complete search history.

(56) References Cited

U.S. PATENT DOCUMENTS 5,563,239 A * 10/1996 Hubbs .................... C08G 63/06
521/48
6,245,537 B1 * 6/2001 Williams ............... A61B 42/00
424/422

FOREIGN PATENT DOCUMENTS

EP         0052459    *  5/1982

* cited by examiner

*Primary Examiner* — Robert C Boyle
(74) *Attorney, Agent, or Firm* — Renner Kenner Greive Bobak Taylor & Kenner

(57) ABSTRACT

Biodegradable polyesters are made by synthesizing copolymers derived from biodegradable hydroxyacid monomers as well as from hydroxyacid monomers containing a functional group such as an azide group, a halogen group, a thioacetate group, and the like. Preferably, the functionalized biodegradable polyester copolymers are derived from a functionalized hydroxyacid such as a homolog of lactic acid and/or glycolic acid with the copolyester thus containing functional groups on the backbone thereof. These biodegradable polyesters can be utilized wherever biodegradable polyesters are currently used, and also serve as a polymer to which various medical and drug delivery systems can be attached.

22 Claims, 5 Drawing Sheets

Direct polycondensation of glycolic acid, lactic acid and 2-halo-3-hydroxypropionic acid Poly(lactic acid-co-glycolic acid) copolymer 2-halo-3-hydroxypropionic acid (HHPPA)

Synthesis of 2-halo-hydroxypropionic acid from DL-Serine

Direct polycondensation of 2-halo-hydroxypropionic acid

Co-polyesterification of 2-bromo-3-hydroxypropionic acid glycolic acid and/or lactic acid N,N'-Diisopropylcarbodiimide 4-(dimethylamino)pyridinium 4-toluenesulphonate N,N'-Diisopropylurea Direct polycondensation of glycolic acid, lactic acid and
2-halo-3-hydroxypropionic acid Iodide, azide and thioacetate functionalization reactions on the small model molecule

FUNCTIONAL BIODEGRADABLE POLYMERS

CROSS REFERENCE

This patent application is a Continuation Application of and claims the benefit and priority of U.S. patent application Ser. No. 13/812,604, filed Jul. 28, 2011 (currently pending), which is a National Phase filing of PCT/US2011/001333, filed Jul. 28, 2010, which claims the benefit and priority of U.S. provisional application 61/368,413, filed Jul. 28, 2010 for FUNCTIONAL BIODEGRADABLE POLYMERS, all of which is hereby fully incorporated by reference.

STATEMENT REGARDING FEDERALLY SPONSORED RESEARCH OR DEVELOPMENT

This invention was made with government support under DMR 0322338 and DMR 0630301 awarded by National Science Foundation. The government has certain rights in the invention.

FIELD OF THE INVENTION

The present invention relates to biodegradable polyester polymers or copolymers containing functionalities on their backbone that are capable of being covalently attached to compounds such as drugs or other therapeutic molecules for making drug delivery medications, or other small molecules of interest. More specifically, the invention relates to forming functionalized biodegradable polyesters or copolyesters derived from biodegradable hydroxyacid monomers and functional monomers.

BACKGROUND OF THE INVENTION

Traditional biodegradable polymers, like polyl(actic acid) (PLA), poly(glycolic acid) (PGA) and their copolymers (PLGA), see FIG. 1, do not have functionalities on their backbones. Such biodegradable polymer systems are therefore not able to covalently attach drugs or other therapeutic molecules for making drug delivery devices, or other functional molecules for a variety of applications. Instead, the functional molecules, such as therapeutic agents have to be physically entrapped into these polymers, either by forming micelles of by nano-encapsulation.

Recently, much attention has focused on the development of degradable and bioabsorbable polymers for biomaterials, and disposable or non-recoverable polymer goods applications. Biodegradable plastics are able to replace non-biodegradable polymers like polystyrene and poly(ethylene terephthalate) (PET) in a variety of applications. For example, Cargill Dow LLC under the trade name Nature Works is using PLA to make biodegradable products like dairy containers, food trays, cold drink cups, products for packaging applications, bottles for fruit juices, sport drinks and jams and jellies; poly(butylene succinate) is being used in agricultural applications in the form of mulch films, bags for seedlings and replanting pots; poly(butylene succinate) is also being used for manufacturing packaging films, bags and flushable feminine hygiene products because of its excellent mechanical properties. Traditional biodegradable polymers have included polyamides, polyanhydrides, polycarbonates, polyesters, polyesteramides, and polyurethanes, which incorporate a degradable linkage into the backbone that can be cleaved by hydrolytic, enzymatic and oxidative processes. Of these, aliphatic polyesters, specifically poly(lactic acid) (PLA), poly(lactic-co-glycolic acid) (PLGA) and poly (ε-caprolactone) (PCL), have become the most widespread biomedical soft materials, finding use in drug and gene delivery, sutures, stents, dental implants and as tissue engineering scaffolding. Aliphatic polyesters have found success due to their ease of preparation, good mechanical properties and relatively quick in vivo degradation to small molecules easily absorbed or excreted by the body. However, PLA, PLGA and PCL lack pendant functional groups, which is a major limitation for a large number of applications. Pendant functionality is highly desirable for the fine-tuning of properties such as rate of crystallization, fire retardancy, color, hydrophobicity, bioadhesion, biodegradabiilty and the loading of therapeutics. Because of this, it is of great importance that an efficient route to main-chain functionalization of aliphatic polyesters and their random, graft, or block copolymers be found.

Polyesters are generally prepared by polycondensation of diols with diacids (A-A monomers+B-B monomers), self-condensation of hydroxyacids (A-B monomers), or by ring-opening polymerization of lactones. However, many useful functional groups, e.g. hydroxyl, thiol, amine and carboxylic acid, are incompatible with these types of polymerization as they form cross-links, eliminating the functionality. Protecting group chemistry, chemoselective step-growth polymerization and ring-opening polymerization of monomers with nonreactive functional groups have all been used to address this problem to varying degrees of success to prepare polyesters with hydroxyl, thiol, ketone, halogen, azido, alkyne and poly(ethylene glycol) (PEG) pendant groups. However, no highly versatile and general strategy for functionalization aliphatic polyesters has yet been developed.

2-Halo-3-hydroxypropionic acid (HHPA) is a halogenated constitutional isomer ($C_3H_5XO_3$) of LA ($C_3H_6O_3$), with a primary alcohol like GA ($C_2H_4O_3$), and is therefore an ideal co-monomer for incorporation of α-halo ester functionality into PLGA, PLA, PGA and/or their copolymers with other classes of polymers, including both condensation and addition polymers. Such polyesters are potentially biodegradable, and can be further functionalized post-polymerization, via nucleophilic substitution, radical addition, radical-radical coupling and/or electrophilic substitution.

α-Halo esters are activated to nucleophilic attack by three mechanisms: inductive electron withdrawal by the adjacent carbonyl, reduced steric bulk at the σ* orbital of the carbon-halogen bond due to the adjacent carbonyl and through-space electron donation from the σ-orbital of the carbon-halogen bond to the π* orbital of the carbonyl. Because of this activation, α-halo esters undergo nucleophilic substitution by a number of hard (e.g. alcohol, alkoxide, carboxylate and primary amine), soft (e.g. cyanide, iodide, thio and thioalkoxide) and borderline hard/soft nucleophiles (e.g. azide, nitroxide and pyridine) under mild conditions. The major hurdle to this type of reaction is chain scission due to attack at the carbonyl or α-elimination. For these reasons, very reactive/hard nucleophiles such as alkoxide or carbanions may not be suitable for this type of reaction.

α-Halo esters participate in electrophilic substitution reactions via lithium metalation, Grignard and Reformatsky chemistries. Of these, Reformatsky reactions are the most mild and therefore, potentially of the most useful. The classical Reformatsky reaction involves the coupling of an α-haloester with an electrophile, via a zinc enolate intermediate. First, zinc reacts with an α-haloester, by insertion into the carbon-halogen bond, to form an enolate. This enolate is then reacted with an electrophile, traditionally an aldehyde or ketone but also an anhydride, phosphonate or α,β-unsaturated carbonyl.

α-Halo esters participate in radical reactions due to the weakness of the carbon-halogen bond, which undergoes homolytic cleavage under redox conditions to form a carbon centered radical. Curran et al. [Synthesis 1988, 489-513] and Matyjaszewski et. al. have shown that α-halo esters can add across the double bond of an olefin in atom transfer radical coupling and polymerization reactions, respectively. Depending on the structure of the olefin this can impart new functional groups onto the polymer, Jerome et. al. have used ring-opening of α-chloro lactones to prepare chloro functional polyesters. They further derivatized these polyesters by coupling with 3-butenyl benzoate to demonstrate radical coupling and using them as macroinitiators for the atom transfer radical polymerization (ATRP) of methacylate to prepare graft copolymers. Depending on the location of the α-halogen the architecture of the system can be controlled. If the halogen is spread throughout the polymer backbone, grafting-to or grafting-from structures can be made. If the halogen is at the chain end then block copolymers can be readily made.

SUMMARY OF THE INVENTION

Biodegradable polyesters containing functional groups on their backbone are generally prepared by two different routes. One route relates to the co-polyesterification of various hydroxyacid monomers and other monomers containing functional groups therein via a two-step route initially utilizing high temperature, low pressure and a catalyst and subsequently a linking agent, a different catalyst and ambient temperatures. The second route relates to a co-polyesterification of various hydroxyacid monomers and the functionalized monomers in the presence of an acid catalyst, high temperatures, and low pressures.

The use of 2-halo-3-hydroxypropionic acid as a co-monomer with a diol plus diacid system or a hydroxyacid, preferably GA and/or LA, incorporates halogen functionality therein and produces high molecular weight halogenated polyesters, by direct polycondensation. The co-polycondensation is acid catalyzed and driven by high temperature, e.g. from about 50° C. to about 180° C. and preferably from about 90° C. to about 110° C., and vacuum, e.g. from about 10 mm Hg to about 50 mm Hg and preferably from about 0 mm Hg to about 3 mm Hg. A small amount of high boiling solvent, preferably diphenylether (DPE) is used to plasticize the bulk. Copolymers with various compositions of LA, GA and 2-bromo-3-hydroxypropionic acid (BHPA) were prepared with number-average molecular weights of 2,000 to 40,000 Da relative to polystyrene ($Da_{PSt}$), preferably about 8,000 to about 20,000 $Da_{PSt}$ (FIG. 5; FIG. 9, Table 1). To investigate potential reactions to functionalize the brominated polyester, a small molecule model compound, methyl 3-acetoxy-2-bromopropanoate (MABP), was synthesized and derivatized by nucleophilic substitution with sodium azide, sodium iodide and sodium thioacetate. Adapting from these conditions, the brominated polyester was functionalized into azido, iodo and thioester derived polyesters (FIG. 10). Further functionalization reactions were performed on the iodinated polyester.

In one aspect of the invention, a functionalized biodegradable copolyester is disclosed, comprising repeat units derived from one or more diols containing from 2 to about 10 carbon atoms and one or more dicarboxylic acids containing from 2 to about 15 carbon atoms, or repeat units derived from one or more hydroxyacids containing from 2 to about 20 carbon atoms, or both; repeat units derived from one or more functionalized hydroxyacids; and wherein said copolyester is a random, statistical copolymer and is biodegradable.

In another aspect of the invention, a process for synthesizing a functionalized biodegradable copolyester is disclosed comprising the steps of reacting one or more diols containing from 2 to about 10 carbon atoms with1 one or more dicarboxylic acids containing from 2 to about 15 carbon atoms, or reacting one or more hydroxyacids containing from 2 to about 20 carbon atoms, or both; with one or more funotionalized hydroxyacids at low pressure and elevated temperature in the presence of a protonic acid catalyst or a Lewis acid catalyst.

DETAILED DESCRIPTION OF THE INVENTION

The invention is initially described with respect to specific monomers and reaction conditions and then subsequently with regard to overall reaction conditions and compounds.

Figure 1:
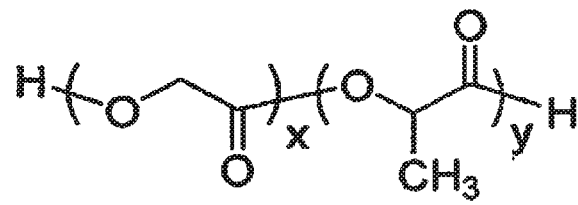
FIG. 1 illustrates poly(lactic acid-co-glycolic acid) copolymer.
Figure 2:
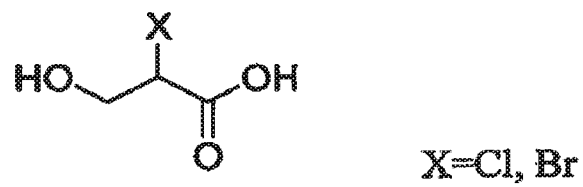
FIG. 2 illustrates 2-halo-3-hydroxypropionic acid (HH-PPA)
Figure 3:
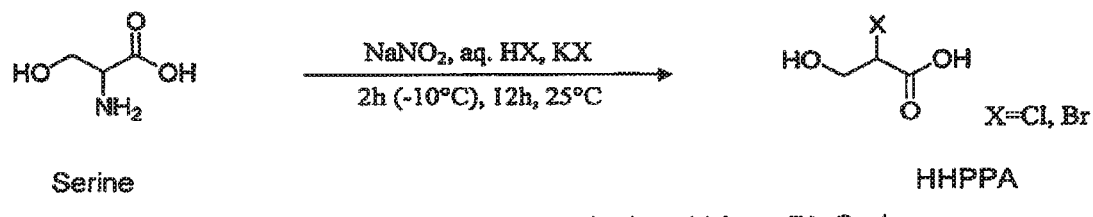
FIG. 3 illustrates synthesis of 2-halo-3-hydroxypropionic acid from DL-Serine.
Figure 4:
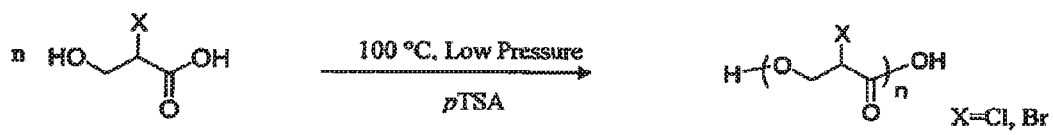
FIG. 4 illustrates direct polycondensation of 2-halo-hydroxypropionic acid.
Figure 7:
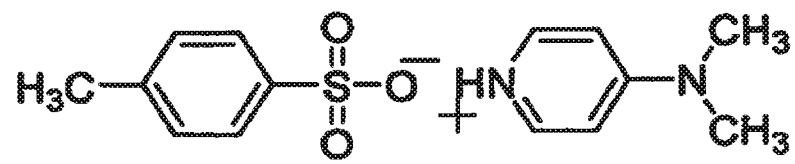
FIG. 7 illustrates 4-(dimethylamino)pyridinium 4-toluenesulphonate
Figure 8:
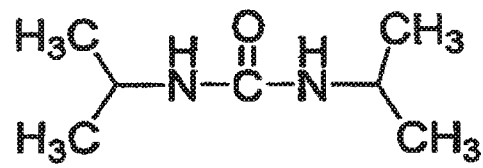
FIG. 8 illustrates N,N'-Diisopropylurea.

Biodegradable polyesters are made by synthesizing copolymers derived from biodegradable hydroxyacid monomers as well as from hydroxyacid monomers containing a functional group such as an azide group, a halogen group, a thioacetate group, and the like. Alternatively, or in addition thereto, biodegradable polyesters can be made from various diols having from 2 to about 10 carbon atoms and desirably from about 2 to about 3 carbon atoms and dicarboxylic acids having from about 2 to about 15 carbon atoms, desirably from about 2 to about 10 carbon atoms and preferably from about 2 to about 8 carbon atoms. Preferably, the functionalized biodegradable polyester copolymers are derived from a functionalized hydroxyacid such as a homolog of lactic acid and/or glycolic acid with the copolyester thus containing functional groups on the backbone thereof. Synthesized 2-halo-3-hydroxypropionic acids can be utilized as the key intermediate for the synthesis of acrylate-based inimers that can be polymerized by atom transfer radical polymerization or functionalized and polymerized by reversible addition-fragmentation chain transfer (RAFT) polymerization to produce hyperbranched polyacrylates. 2-Halo-3-hydroxypropionic acid is essentially a functionalized constitutional isomer of lactic acid (LA), and can therefore be used to synthesize halogenated poly(lactic acid), poly(glycolic acid), poly(lactic-co-glycolic acid) (PLGA), and other halogenated polyesters and condensation polymers in which the halogen can be used as a backbone attachment site for a compound such as a drug, therapeutic compound, antibody, peptide, nucleating agent, fire retardant, or other molecule of interest to the biodegradable, FDA-approved PLGA backbone, 2-Halo-3-hydroxypropionic acid (FIG. 2) is synthesized by a deaminohalogenation reaction of D-, L- or D,L-serine (FIG. 3). This monomer is a hydroxyacid, which can self-condense under acidic conditions to form oligo(halohydroxypropionic acid) (FIG. 4). This reaction is driven by applying heat and vacuum, to produce oligomers of number average molecular weight, $M_n \geq 1,500$ Da. By a polyesterification reaction, the halohydroxypropionic acid monomer is also copolymerized with lactic acid, glycolic acid and other hydroxyacids to form random, statistical copolymers. This polyesterification (FIG. 5) can be performed at high temperature and low pressure with subsequent polymerization occurring with a linking agent at room temperature under dry conditions using dichloromethane as a solvent, disopropylcarbodiimide (DiPC) (FIG. 8) as the linking agent and dimethylaminopyridinium toluenesulphonate (DPTS) (FIG. 7) as the catalyst. After the reaction, the byproduct, diisopropylurea (DiPU) (FIG. 8) and the catalyst, DPTS, are washed out with a methanol/wafer mixture and the polymer is precipitated out in isopropyl alcohol (IPA) or in hexane/methanol (95%, 5%, v %, v %) mixture. Typical $M_n$ of about 8,000-10,000 Da are obtained.

Figure 9:
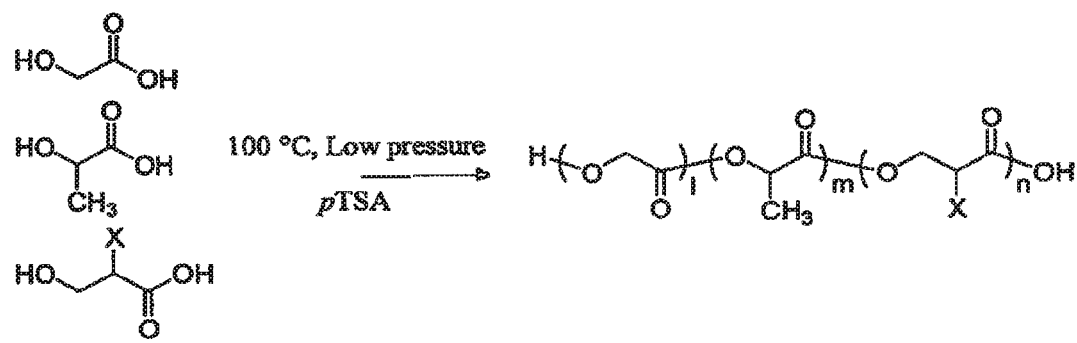
FIG. 9 illustrates direct polycondensation of glycolic acid, lactic acid and 2-halo-3-hydroxypropionic acid.

The co-polyesterification of the halohydroxypropionic acid with lactic acid and glycolic acid can also be performed in bulk using p-toluenesulphonic acid (PTSA) as a catalyst (FIG. 9). This reaction is driven by applying heat and vacuum and a typical $M_n$ of $\geq 5,000$ Da is observed.

The functionalized 2-halo-3-hydroxypropionic acid (HHPPA) is produced by reacting serine will an alkali nitrite such as sodium nitrite in the presence of an aqueous acid, preferably hydrobromic acid or hydrochloric acid, and potassium bromide or potassium chloride initially at low temperatures such as from about minus 35° C. to about 0° C. and preferably from about minus 15° C. to about minus 5° C. for short periods of time, such as from about 1 to about 6 hours and desirably from about 1.5 to about 2.5 hours until the addition of HX/KX to serine is complete. Subsequently, the reaction is continued at from about 5° C. to about 60° C., and desirably from about 15° C. to about 40° C., and most preferably from about 20° C. to about 30° C. for about 1 to about 48 hours and desirably from about 5 to about 24 hours, and most preferably from about 10 to about 14 hours to produce the halogenated hydroxyacid, i.e. HHPPA. Other hydroxy-containing amino acids such as tyrosine can also be used in this reaction.

HHPPA can be polymerized under high temperature and low pressure in the presence of a catalyst to produce a polymer as set forth in FIG. 4. That is, under acidic conditions as in the presence in p-toluenesulfonic acid, $SnCl_2$, or SnO, HHPPA can self-condense at temperatures of from about 50° C. to about 180° C. and desirably from about 80° C. to about 150° C., and most preferably from about 90° C. to about 110° C. at low pressures of from about 0 mm Hg to about 50 mm Hg and desirably from about 0 mm Hg to about 10 mm Hg, and most preferably from about 0 mm Hg to about 3 mm Hg in the presence of an acid catalyst such as p-toluenesulfonic acid, $SnCl_2$, or SnO, and the like. The resulting polymer generally has a number average molecular weight of at least about 2,000, desirably from about 6,000 to about 30,000, and most preferably from about 20,000 to about 25,000 Da.

HHPPA and other functional-containing hydroxy acid monomers can be utilized to form biodegradable copolyesters by two different routes, for example co-polyesterification or by bulk polymerization of hydroxyacid monomers.

Examples of hydroxyacids that are nitrogen free, have a total of from 2 to about 20 carbon atoms and desirably 2 or 3 carbon atoms and contain at least 1 hydroxyl group include glycolic acid, galactaric acid, hydroxypropionic acid, lactic acid, hydroxybutyric acid, hydroxyisobutyric acid, hydroxy methylbutyric acid, bis(hydroxymethyl) propionic acid, gibberellic acid, hydroxyoctadecanoic acid, di-tert-butyl hydroxybenzoic acid, benzilic acid, hydroxyl fluorenecarboxylic acid, hydroxydecanoic acid, hydroxynaphthalenecarboxylic acid, hydroxybenzenedicarboxylic acid, hydroxymethylbenzoic acid, hydroxyphenylacetic acid, mandelic acid, hydroxymethoxybenzoic acid, methoxysalicylic acid, hydroxyoctanoic acid, hydroxycinnamic acid, dihydroxycinnamic acid, dihydroxyhydrocinnamic acid, hydroxyphenylpropionic acid, dihydroxytartaric acid, hydroxymethoxycinnamic acid, salicylic acid, citrazinic acid, galacturonic acid, glucuronic acid, hydroxypropanedioic acid, hydroxyphenyl propionic acid, lactic acid, methoxysalicylic acid, tartaric acid, or trihydroxybenzoic acid, or any combination thereof. Lactic acid and glycolic acid are preferred. The above hydroxyacids that can be functionalized can be utilized, of course, as functionalized monomers. Examples of such funotionalized monomers include chlorohydroxybenzoic acid, chloromandelic acid, chlorosalicylic acid, dibromo hydroxybenzoic acid, dichlorohydroxy-benzoic acid, dichlorosalicylic acid, or any combination thereof.

The HHPPA monomer and other functionalized acids can be reacted with various functional groups such as a halogen, an azide, a thioacetate, and the like in a manner well known to the art and to the literature. Upon reaction of the functionalized hydroxyacid, copolyesters are produced wherein a functional group is located on the backbone of the polymer.

Figure 5:
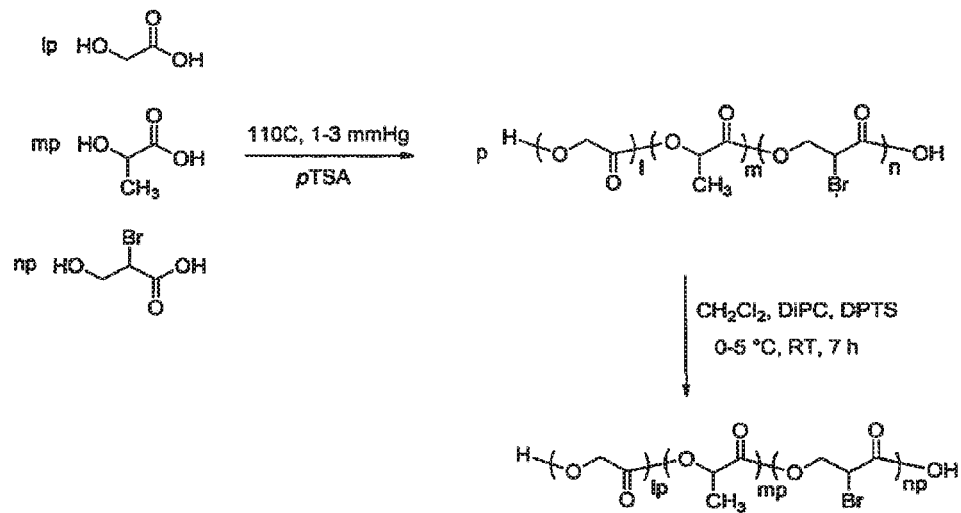
FIG. 5 illustrates co-polyesterification of 2-bromo-3-hydroxypropionic acid glycolic acid and/or lactice acid via a multi-step process.
Figure 6:
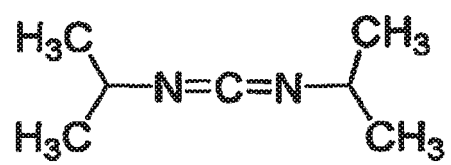
FIG. 6 illustrates N,N'-Diisopropylcarbodiimide.

The multi-step polyesterification route as set forth in FIG. 5 produces a statistical copolymer. The initial step is carried out at high temperatures, generally from about 50° C. to about 180° C., desirably from about 80° C. to about 150° C. and preferably from about 90° C. to about 110° C. Low pressures are utilized such as from about 0 mm Hg to about 50 mm Hg, desirably from about 0 mm Hg to about 10 mm Hg and preferably from about 0 mm Hg to about 3 mm Hg. Protonic or Lewis acids are utilized with specific compounds including p-dimethylaminopyridinium toluenesulphonate (DPTS), p-toluidine hydrochloride, dimethyl-p-phenylenediamine dihydrochloride, p-toluenesulphonic acid, and the like with p-toluenesulphonic acid being preferred. The amount of catalysts is generally small and ranges from about 0.01 equivalents to about 1.0 or to about 5 equivalents and desirably from about 0.03 equivalents to about 0.5 equivalents, and most preferably from about 0.05 equivalents to about 0.1 equivalents based upon the total equivalents of all hydroxyacid monomers. These reaction conditions generally produce a prepolymer, see FIG. 5. The prepolymer generally has the number average molecular weight of from about 2,000 Da to about 20,000 Da, desirably from about 4,000 Da to about 10,000 Da, and preferably from about 8,000 Da to about 9,000 Da. The reaction times will vary from about 2 hours to 48 hours, desirably from about 8 hours to 24 hours, and preferably from about 12 hours to 16 hours.

A subsequent step utilizes various solvents that include halogenated solvents such as dichloromethane and chloroform, polar solvents such as N,N-dimethylformamide, ether solvents such as tetrahydrofuran and aromatic solvents such as toluene, see FIG. 5. Dichloromethane and tetrahydrofuran are preferred. Suitable amounts of solvents are generally such that the various monomers can be readily dissolved and generally involve concentrations of from about 0.1 M to about 2 M and desirably from about 0.2 M to about 1.5 M, and most preferably from about 0.7 M to about 1 M.

Activating and dehydrating linking agents generally include carbodiimides with specific examples including diisopropylcarbodiimide, dicyclohexylcarbodiimide and ethyl-3-(3-dimethylaminopropyl)carbodiimide. Suitable amounts of linking agents generally range from about 0.5 equivalents to about 10 equivalents and desirably from about 1 equivalent to about 5 equivalents, and most preferably from about 1.1 equivalents to about 1.5 equivalents based upon the total equivalents of the prepolymer. The linking agents are added to the reaction at a temperature from about 0° C. to about 50° C. and desirably from about 0° C. to about 25° C. and most preferably from about 0° C. to about 5° C. The subsequent reaction is generally carried out at an ambient, temperature of from about 10° C. to about 50° C., desirably from about 15° C. to about 35° C., and preferably from about 20° C. to about 30° C. for about 0.5 hours to about 24 hours and desirably from about 4 hours to about 7 hours. Catalysts for the subsequent reaction generally include protonic and latent protonic acids with specific compounds including p-dimethylaminopyridinium toluenesulphonate (DPTS), p-toluidine hydrochloride, dimethyl-p-phenylenediamine dihydrochloride, and the like with p-dimethylaminopyridinium toluenesulphonate being preferred. The amount of catalysts is generally small and ranges from about 0.01 equivalents to about 1.0 or to about 5 equivalents and desirably from about 0.03 equivalents to about 0.5 equivalents, and most preferably from about 0.05 equivalents to about 0.1 equivalents.

The reaction times are generally for about 30 minutes to 24 hours and desirably from about 2 hours to 12 hours, and most preferably from about 4 hours to 7 hours.

The resultant statistical polyester copolymer generally has a number average molecular weight of from about 2,000 Da to about 40,000 Da, desirably from about 5,000 Da to about 32,000 Da, more desirably from about 6,000 to about 25,000 Da, and preferably from about 8,000 Da to about 20,000 Da. After the reaction, various byproducts such as diisopropylurea and the catalyst are washed out of the reaction medium by utilizing a mixture of water and alcohol such as methanol with the polymer being subsequently precipitated as by utilizing a different alcohol such as isopropyl alcohol. The yield of the above described process is generally high, such as from at least about 10 mole %, generally at least about 50 mole %, and preferably at least about 90 mole % of all of said hydroxyacid monomers and functionalized monomers being incorporated into a polymer.

The functionalized biodegradable polyester copolymers derived utilizing the esterification route set forth in FIG. 5 will have repeat units generally in proportion to the amount of monomers utilized, with the repeat units derived from the functionalized hydroxyacids containing a functional group on the backbone thereof. If a biodegradable polyester copolymer having high functionality is desired, the amount of the one or more functionalized hydroxyacid, e.g. "n" is generally from about 10 or about 20 to about 99 mole %, desirably from about 30 to about 80 mole %, and most preferably from about 35 to about 50 mole %, with the amount of the one or more biodegradable monomers, e.g. "l" and "m" being the difference. When lactic acid and glycolic acid are used, the amount of the lactic acid and glycolic acid units is from about 1 to about 97 mole %, desirably from about 20 to about 80 mole %, and preferably from about 40 to about 60 mole % based upon the total moles of said lactic acid and said glycolic acid.

The alternate bulk polymerization, high temperature, acid catalyst, low pressure route as set forth in FIG. 9 also produces a random, statistical biodegradable polyester copolymer and only requires a catalyst since, of course, solvents are not required. The polymerization temperature is generally from about 50° C. to about 180° C., desirably from about 80° C. to about 150° C., and preferably from about 90° C. to about 110° C. In order to remove water generated by the reaction, a vacuum or low pressures are utilized such as from about 0 mm Hg to about 50 mm Hg, desirably from about 0 mm Hg to about 10 mm Hg, and preferably from about 0 mm Hg to about 3 mm Hg. Suitable catalysts include various protonic and Lewis acids such as those set forth herein above with para-toluenesulphonic acid and $SnCl_2$ being preferred. The amount of the catalyst is generally from about 0001 to about 1.0 or to about 5.0 equivalents, desirably from about 0.03 to about 0.5 equivalents, and preferably from about 0.05 to about 0.1 equivalents based upon the total equivalents of all hydroxyacid monomers. The molecular weight of this route is generally the same as that of the multi-step reaction route of FIG. 5, and thus copolymers are produced generally having a number average molecular weight of from around 2,000 Da to about 40,000 Da, desirably around 5,000 kDa to preferably 32,000 Da, and more desirably from about 6,000 Da to about 25,000 Da, and most preferably from about 3,000 kDa to about 20,000 kDa. The yield of the above described process is generally high, such as from at least about 10 mole %, generally at least about 50 mole %, and preferably at least about 90 mole % of all of said hydroxyacid monomers and functionalized monomers being incorporated into a polymer. The reaction time is generally from about 2 hours to about 72 hours, desirably from about 24 hours to about 60 hours, and preferably from about 36 hours to about 48 hours.

If desired, the various biodegradable copolyesters can contain conventional additives in conventional amounts known to the art and to the literature such as light stabilizers, pigments, heat stabilizers, anti-static agents, UV absorbers, antioxidants, and the like, as well as various inorganic fillers such as calcium carbonate, clay, silica, and the like.

The statistical random polyester copolymers as set forth in FIGS. 5 and 9 generally contain a halogen group that is bromo. The repeat unit containing the halogen is set forth on the left side of FIG. 10. This repeat bromo group can be reacted by three different routes to yield the same copolyester but wherein the bromo group is an iodo group, an azide group, or a thioacetate group, see right side of FIG. 10. For example, if the copolyester of either FIGS. 5 and 9 are desired to have a pendant iodo functional group thereon, a copolymer can be reacted with an alkali metal iodate compound with any group one metal iodide salt such as sodium iodide or potassium iodide, under an inert gas such as nitrogen and argon, from temperatures that range from −40° C. to 60° C., ideally from 25° C. to 30° C. The amount of azide relative to the brominated repeat unit can range from 1 to 5 but preferably from 1.5 to 2.5 equivalences.

Similarly, if the bromine group set forth in FIGS. 5 and 9 of the copolyester are desired to foe replaced by an azide group, the following reaction can be utilized. Any group with one metal azide salt such as sodium azide or potassium azide, can be reacted under an inert gas such as nitrogen and argon, from temperatures that range from −40° C. to 60° C. ideally from 0° C. to 25° C. The amount of azide relative to the brominated repeat unit can range from 0.5 to 1.5 equivalences but ideally is 0.75 to 0.95 equivalence.

If the bromo group on the copolyester polymers of FIGS. 5 and 9 are desired to be replaced with a thioacetate group, the following reaction can be utilized. With any group one metal thioacetate salt such as sodium thioacetate or potassium thioacetate can be reacted, under an inert gas such as nitrogen and argon, from temperatures that range from −20° C. to 70° C. Ideally from 0° C. to 30° C. The amount of thioacetate relative to the brominated repeat unit can range from 0.5 to 1.5 equivalences but ideally is 0.75 to 1.5 equivalences.

The polymer system of the present invention has the advantage of a good leaving group (halogen) attached to the main chain of the biodegradable polymer. As noted above, the number of functional groups on the main chain of this biodegradable polymer can be varied by varying the feed ratio of the functionalized monomer such as 2-halo-3-hydroxypropionic acid monomer. The biodegradability of the polymer can also be tailored by varying the biomonomers such as lactic acid and glycolic acid feed ratios. Based on the ability of n-butylamine and pyridine to displace bromine from methyl 2-bromopropionate, and 4-amino-1-butanol and 5-amino-1-pentanol to displace the bromine end group from poly(methyl acrylate) (PMA), without reaction at the ester groups, functionalized PLGAs and other polyesters should be synthesized by reaction with the amine group of bioactive molecules. An example of potential application of this system is the covalent attachment of silver N-heterocyclic carbene (NHC) complexes developed by Youngs, et al. [Chem. Rev. 2005, 105, 3978-4008] at the halogen sites of the poly(halohydroxypropionic acid-co-lactic acid co-glycolic acid) copolymer system. Previous NHCs have been shown to have antibacterial properties, and covalently attaching them would potentially give us a drug delivery device with slow release antibacterial properties.

The reference will be better understood by reference to the following examples which serve to illustrate, hut not to limit the present invention.

EXAMPLES

Materials

18-Crown-6 (Janssen, 99%), diphenyl ether (Acros, 99%), glycolic acid (TCI, 98.0%), hydrobromic acid (Fluka, 48 w/w % aq), D,L-lactic acid (Acros, 86%), potassium bromide (Acros, 98%), potassium thioacetate (Acros, 93%), D,L-serine (Alfa Aesar, 99%, sodium azide (Aldrich, 99%), sodium iodide (J. T. Baker), sodium nitrite (Sigma-Aldrich, 99.5%), succinonitrile (Sigma Aldrich, 99%) and p-toluenesulfonic acid monohydrate (pTSA; Aldrich, 98%) were used as received. Acetyl chloride (98%, Sigma-Aldrich) was distilled from $PCl_5$. Diethyl ether (ACS GR, EMD) was distilled from purple sodium benzophenone ketyl under $N_2$. N,N-Dimethylformamide (ACS GR, EMD) was vacuum distilled from $CaH_2$ and stored over $MgSO_4$. Triethylamine (99.5%, Aldrich) was distilled from and stored over KOH under $N_2$. All other reagents and solvents were commercially available and were used as received.

Techniques

All reactions were performed under a $N_2$ atmosphere using a Schlenk line unless noted otherwise. $^1H$ and $^{13}C$ NMR spectra (δ, ppm) were recorded or a Varian Mercury 300 (300 MHz and 75 MHz, respectively). Unless noted otherwise, all spectra were recorded in $CDCl_3$, and the resonances were measured relative to residual solvent resonances and referenced to tetramethylsilane. Number-($M_n$) and weight average ($M_w$) molecular weights relative to linear polystyrene ($GPC_{PSt}$) and polydisperisties (pdi=$M_w$/$M_n$) were determined by gel permeation chromatography (GPC) from calibration curves of log $M_n$ vs. elution volume at 35° C. using tetrahydrofuran (THF) as solvent (1.0 mL./min), a set of 50 Å, 100 Å, 500 Å, $10^4$ Å and linear (50–$10^4$ Å) Styragel 5 µm columns, a Waters 486 tunable UVA/Vis detector set at 254 nm, a Waters 410 differential refractometer, and Millenium Empower 2 software.

Example 1

Synthesis of 2-bromo-3-hydroxypropionic acid (FIG. 3)

$NaNO_2$ (69 s, 1.0 mol) was added in 12 portions over three h to a cooled (−13° C.) solution of D,L-serine (53 g, 0.51 mol), potassium bromide (180 g; 1.5 mol), and hydrobromic acid (120 ml, 48 wt %, 1.0 mol) in distilled water (400 ml) that had been sparged with $N_2$; the solution turned brown upon addition of $NaNO_2$. The solution was warmed to room temperature (23° C.) and stirred for 16 h. It was then salted out with NaCl and extracted five times with ethyl acetate (100 mL ea). The aqueous layer was acidified with concentrated HBr to pH<2 and extracted five times with ethyl acetate (100 mL ea). The organic layers were combined and dried over $MgSO_4$. After filtration and removing the solvent by rotary evaporation, followed by drying under vacuum on a Schlenk line, the resulting yellow solid was recrystallized from $CH_2Cl_2$ to yield 55 g (64%) of 2-bromo-3-hydroxypropionic acid as a white crystalline solid; mp 48-51° C. $^1$H-NMR ($CDCl_3$/DMSO-$d_6$): 3.58; (dd, CHH, $^2J$=11.8 Hz, $^3J$=5.9 Hz), 3.71; (dd, CHH, $^2J$=11.6, $^3J$=7.5 Hz), 3.99; (dd, CHBr, $^3J$=7.3, $^3J$=6.1 Hz). $^{13}$C NMR ($CDCl_3$/DMSO-$d_6$): 45.6; (CBr), 64.0; (COH), 171.0; (C=O).

Examples 2 and 3 relate to the preparation of a bromopropionate compound wherein the end groups contain an unreachable compound so that the bromo group therein can be replaced with an iodo group or with an azido group as set forth respectively, in Examples. 5 and 8. Example 4 relates to the rearrangement of the bromo group in the model compound. Thus, Examples 4, 5, and 6 relate to actual reaction conditions, as utilized in FIG. 10, so that the above-noted bromo group can be replaced with either an iodo, an azide, or a thioacetate group.

Example 2

Synthesis of methyl 2-bromo-3-hydroxypropionate

Concentrated hydrobromic acid (10 drops) was added to a solution of 2-bromo-3-hydroxypropionic acid (10 g, 60 mmol) in methanol (80 mL, 2.0 mol). After refluxing the solution for 17 h, the solvent was removed using a rotary evaporator. The resulting oil was dissolved in $CH_2Cl_2$ (150 mL), and washed twice with aq $NaHCO_3$ (75 mL ea) and once with brine (100 mL). The organic layer was dried over $MgSO_4$. After filtration, the solvent was removed by rotary evaporation, and the residue was distilled (105-110° C./4 mm Hg) to yield 8.7 g (79%) of methyl 2-bromo-3-hydroxypropionate as a yellow oil. $^1$H NMR: 2.22; (br s, OH), 3.83; (s, $CH_3$), 3.95; (dd, CHHOH, $^2J$=12.0 Hz, $^3J$=5.5 Hz), 4.06; (dd, CHHOH, $^2J$=12.1 Hz, $^3J$=7.4 Hz), 4.36; (dd, CHBr, $^3J=5.6$ Hz, $^3J=7.4$ Hz). $^{13}C$ NMR: 44.4; (CHBr), 53.4; (CH$_3$), 63.8; (CH$_2$OH), 169.6; (C=O).

Example 3

Synthesis of methyl 3-acetoxy-2-bromopropionate

A solution (total volume 10 mL) of acetyl chloride (4.2 mL, 31 mmol) in dry ether was added dropwise to an ice-cooled solution of methyl 2-bromo-3-hydroxypropionate (4.6 g, 25 mmol) and triethylamine (4.2 mL, 300 mmol) in dry ether (5 mL). The reaction was then warmed to room temperature (23° C.) and stirred for 16 h. The reaction was poured into ice water (200 mL) and extracted four times with ether (50 mL ea). The organic layers were combined and dried over MgSO$_4$. After filtration, the solvent was removed by rotary evaporation, and the yellow residue was distilled (84-85° C./3 mm Hg) to yield 3.6 g (63%) of methyl 3-acetoxy-2-bromopropionate as a colorless oil. $^1$H NMR: 2.08; (s, CH$_3$CO$_2$), 3.82; (s, CH$_3$O$_2$C), 4.50-4.38; (m, CH$_2$CHBr). $^{13}$C NMR: 20.8; (CH$_3$CO$_2$), 40.4; (CHBr), 53.4; (CH$_3$O$_2$C), 64.2; (CH$_2$), 168.3; (CH$_3$CO$_2$), 170.21; (CO$_2$CH$_3$).

Example 4

Synthesis of methyl 2-acetoxy-2-bromomethylethanoate

A solution of methyl 3-acetoxy-2-bromoproplonate (0.27 g, 1.2 mmol) in succinionitrile (1.0 g, 12 mmol) was stirred and heated at 120° C. in a pressure tube for 72 hours. The product was 64% rearranged by $^1$H NMR integration, $^1$H NMR; 5.42; (t, CHCH$_2$Br), 4.46; (m, CH$_2$CHBr), 3.80; (q, CO$_2$CH$_3$), 3.71; (t, CHCH$_2$Br), 2.20; (s, CH$_3$CO$_2$). $^{13}$C-NMR: 169.90; (C(O)OCH$_3$), 167.56; (CH$_3$C(O)), 71.31; (CH), 52.91; (OCH$_3$), 29.61; (CH$_2$Br), 20.51; (CH$_3$C(O)).

Example 5

Synthesis of methyl 3-acetoxy-3-iodopropionate

A mixture of methyl 3-acetoxy-2-bromopropionate (0.12 g, 0.52 mmol) and sodium iodide (0.16 g, 1.1 mmol) in acetone (1 ml) was stirred at room temperature (23° C.) for 6 h. It was then poured into H$_2$O (10 ml) and extracted five times with CH$_2$Cl$_2$ (3 mL ea). The organic layers were combined, washed with aq Na$_2$S$_2$O$_5$ (10 mL), and dried over MgSO$_4$. After filtration, the solvent was removed by rotary evaporation to yield 0.12 g (86%) of methyl 3-acetoxy-2-iodopropionate as light yellow oil. $^1$H NMR; 2.00; (s, CH$_3$CO$_2$), 3.72; (s, CH$_3$O$_2$C), 4.47-4.35; (m, CH$_2$CHI). 13C NMR: 14.3; (CHI), 20.8; (CH$_3$CO$_2$), 53.3; (s, CH$_3$O$_2$C), 65.7; (CH$_2$), 170.0; (CO$_2$CH$_3$), 170.0; (CH$_3$CO$_2$).

Example 6

Synthesis of methyl 3-acetoxy-2-azidopropionate

A solution of methyl 3-acetoxy-2-bromopropionate (0.11 g, 0.49 mmol) and sodium azide (32.0 mg, 0.49 mmol) in dry DMF (1 mL) was stirred at room temperature (23° C.) for 45 min, and then poured into brine (10 mL) and extracted three times with CH$_2$Cl$_2$ (4 mL ea). The combined organic layers were dried over Na$_2$SO$_4$. After filtration, the solvent was removed by rotary evaporation to yield 50 mg (54%) of methyl 3-acetoxy-2-azidopropionate as slightly yellow oil. $^1$H-NMR: 2.03; (s, CH$_3$CO$_2$), 3.77; (s, CH$_3$O$_2$C), 4.06; (dd, CHN$_3$, $^3J=5.6$, $^3J=4.2$ Hz), 4.32; (dd, CHH, $^2J=11.6$ Hz, $^3J=5.8$ Hz), 4.40; (dd, CHH, $^2J=11.6$, $^3J=4.1$ Hz). 13C NMR: 20.7; (CH$_3$CO$_2$), 53.2; (CH$_3$O$_2$C), 60.4; (CHN$_3$), 63.6 (CH$_2$), 168.3; (CO$_2$CH$_3$), 170.4; (CH$_3$CO$_2$).

Example 7

Synthesis of poly[(lactic acid)-co-(2-bromo-3-hydroxypropionic acid)] in Solution Using Carbodiimide Coupling (FIG. 5)

A mixture of D,L-lactic acid (0.69 g, 8.7 mmol), 2-bromo3-hydroxypropionic acid (0.28 g, 1.7 mmol) and pTSA (50 mg, 0.29 mmol) in a seated Schlenk lube was stirred at 110° C. under reduced pressure (~1-3 mm Hg) for 14 h to create a prepolymer with $M_n=8.81\times10^3$, pdi=2.15. The Schlenk tube was removed from the oil bath, opened to the atmosphere, and is contents were dissolved in CH$_2$Cl$_2$ (60 mL). Half of the contents were transferred to a 50 ml round bottom flask. The solvent was refluxed over oven-dried 4 Å molecular sieves for 18 h to dehydrate the polymer solution. After cooling the polymerization solution to room temperature, DPTS (0.10 g, 0.34 mmol) was added, and the solution was further cooled to 0-5° C. using an ice bath and DIPC (0.20 g, 1.6 mmol) was added drop wise. The reaction was performed for 7 h at room temperature. The polymer was precipitated into methanol (50 mL). The methanol was carefully decanted from the precipitate, and the polymer was dried in vacuo. The polymer was reprecipitated four times from CH$_2$Cl$_2$ (10 mL) into methanol (50 mL) to yield 0.23 g (52%) of halogenated PLA as a white powder; $M_n=1.53\times10^4$, pdi=1.71. $^1$H-HMR: 1.8-1.4; (m, CH$_3$), 4.7-4.4; (m, CHBrCH$_2$), 5.30-5.10; (m, CHCH$_3$). $^{13}$C NMR: 16.62; (CH$_3$), 39.78; (CBr), 64.49; (CH$_2$CHBr), 68.95; (CHCH$_3$), 186.83; (CHBrCO$_2$), 169.33; (C(CH$_3$)COO).

Example 8

Synthesis of poly[(lactic acid)-co-(glycolic acid)-co-(2-bromo-3-hydroxypropionic acid)] by Direct Polyesterification (FIG. 9)

A solution of D,L-lactic acid (0.93 g, 9.0 mmol), glycolic acid (85 mg, 1.1 mmol), 2-bromo-3-hydroxypropionic acid (0.19 g, 1.1 mmol) and pTSA (51 mg, 0.29 mmol) in diphenyl ether (1 ml) in a Schlenk tube was stirred at 95° C. under reduced pressure (~1-3 mm Hg) for 48 h. The Schlenk tube was removed from the oil bath, opened to the atmosphere, and its contents were dissolved in CH$_2$Cl$_2$ (10 mL). The Schlenk tube was cooled to −10° C., and the crystallized diphenyl ether was filtered off. The polymer was precipitated into methanol (50 ml), the solvents decanted, and the product was reprecipitated four times from CH$_2$Cl$_2$ (10 mL) into methanol (50 ml) to yield 0.53 g (53%) of halogenated PLGA as a white powder: $M_n=2.37\times10^4$, pdi=2.51. $^1$H-NMR: 1.4-1.8; (m, CH$_3$), 4.4-4.7; (m, CHBrCH$_2$), 4.7-4.9; (m, CH$_2$CO$_2$), 5.10-5.30; (m, CHCH$_3$). $^{13}$C NMR: 16.6; (CH$_3$), 39.4; (CBr), 60.7; (CH$_2$CO$_2$), 64.5; (CH$_2$CHBr), 69.0; (CHCH$_3$), 168.5; (CH$_2$CO$_2$), 168.5; (CHBrCO$_2$), 169.0; (C(CH$_3$)COO).

Example 9

Partial isomerization of poly[(lactic acid)-co-2-bromo-3-hydroxypropionic acid)] to poly[(lactic acid)-co-(2-bromo-3-hydroxypropionic acid)-co-(2-bromomethyl-2-hydroxyethanoic acid)]

A solution of poly[(lactic acid)-co-(2-bromo-3-hydroxypropionic acid)] ($M_n=5.2\times10^4$, pdi=1.66; 0.10 g, 0.42 mmol Br) in acetonitrile (0.8 mL) in a schelnk tube Was degassed by three freeze-pump-thaw (20 min pumping) cycles. The tube was backfilled with nitrogen and placed in an oil bath at 105° C. for 98 hours. $^1$H NMR spectroscopy demonstrated that 25% of the 2-bromo-3-hydroxypropionate units rearranged to 2-bromomethyl-2-hydroxyethanoate units.

Example 10

Figure 10:
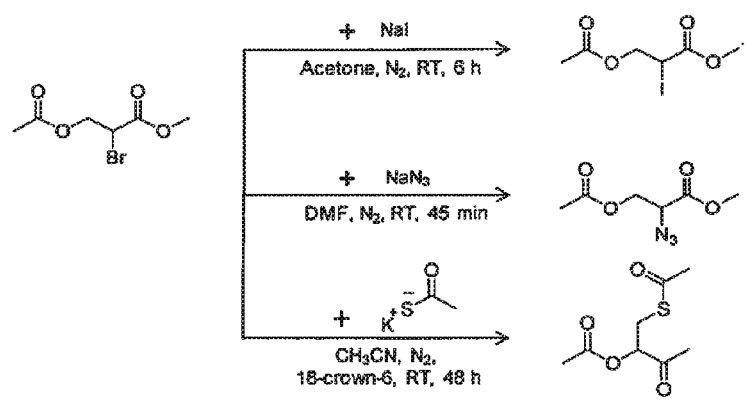
FIG. 10 illustrates iodide, azide and thioacetate functionalization reactions on the model small molecule.
Figure 11:
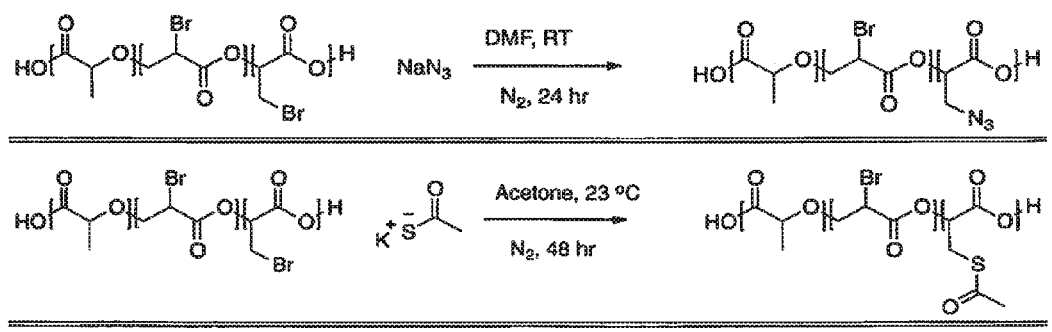
FIG. 11 illustrates a reaction of a rearranged copolyester with sodium azide and with a thioacetate.

Synthesis of poly[(lactic acid)-co-(3-hydroxy-2-iodopropionic acid)] (see FIG. 10)

A solution of poly[(lactic acid)-co-(2-bromo-3-hydroxypropionic acid)] ($M_n$=9.50×10$^3$, pdi=1.42; 0.40 g, 1.3 mmol Br) and sodium iodide (0.17 g, 1.1 mmol) in acetone (1 mL) and stirred at room temperature (23° C.) for 48 h. The reaction mixture was diluted with CH$_2$Cl$_2$ (10 mL), washed once with water (10 mL), and precipitated into ice-cooled i-propanol (200 mL) to yield 0.43 g (94%) of copolymer as a yellow solid; $M_n$=8.48×10$^3$, pdi=1.41. $^1$H NMR: 1.4-1.7; (m, CH$_3$), 4.4-4.6 (m, CH$_2$CHI), 5.3-5.1; (m. CHCH$_3$). $^{13}$C NMR: 13.2; (CHI), 16.6; (CH$_3$), 66.0; (CH$_2$), 69.0; (CHCH$_3$), 168.3; (CHBrCO$_2$), 168.8; (CHICO$_2$), 169.2; (C(CH$_3$)COO)

Example 11A

Synthesis of poly[(lactic acid)-co-(3-hydroxy-2-azidopropionic acid)] (see FIG. 10) Starting from the Brominated Copolymer A solution of poly[(lactic acid)-co-(2-bromo-3-hydroxypropionic acid)] ($M_n$=95.0×10$^3$, pdi=1.42; 0.20 g, 0.62 mmol Br) and sodium azide (36 mg, 0.58 mmol) in dry DMF (1 mL) and stirred at room temperature (23° C.) for 48 h. The reaction mixture was diluted with CH$_2$Cl$_2$ (10 mL), washed once with water (10 mL), and precipitated into ice-cooled i-propanol (200 mL) to yield 0.11 g (62%) of copolymer as a yellow solid; $M_n$=1.56×10$^3$, pdi=1.71. $^1$H NMR: 1.4-1.7; (m, CH$_3$), 4.2-4.3; (m, CHN$_3$), 4.4-4.6; (m, CH$_2$), 5.3-5.1; (m, CHCH$_3$). $^{13}$C HMR: 16.6; (CH$_3$), 39.6; (CHBr), 60.0; (CHN$_3$), 64.2; (CH$_2$), 69.1; (CHCH$_3$), 166.8; (CHBrCO$_2$), 169.3; (C(CH$_3$)COO); 173.2; (CHN$_3$CO$_2$).

Example 11B

Synthesis of poly[(lactic acid)-co-(3-hydroxy-2-azidopropionic acid)] (see FIG. 10) Starting from the Iodinated Copolymer A solution of poly[(lactic acid)-co-(2-iodo-3-hydroxypropionic acid)] ($M_n$=8.45×10$^3$, pdi=1.41; 0.11 g, 0.12 mmol I) and sodium azide (13 mg, 0.21 mmol) in dry DMF (1 mL) and stirred at room temperature (23° C.) for 48 h. The reaction mixture was diluted with CH$_2$Cl$_2$ (10 mL), washed once with water (10 mL), and precipitated into ice-cooled i-propanol (200 mL) to yield 0.13 g (87%) of copolymer as a yellow solid; $M_n$=1.97×10$^3$, pdi=1.41.

Example 11C

Synthesis of poly[(lactic acid)-co-(2-bromo-3-hydroxypropionic acid)-co-(2-acetylthiomethyl-2-hydroxyethanoic acid)] (see FIG. 10) Starting from the Brominated Copolymer A solution of poly[(lactic acid)-co-(2-bromo-3-hydroxypropionic acid)] ($M_n$=9.50×10$^3$, pdi=1.42; 0.20 g, 0.60 mmol Br), potassium thioacetate (65 mg, 5.7 mmol) and 18-crown-6 (29 mg, 0.10 mmol) in acetonitrile (2 mL) was stirred at room temperature (23° C.) for 48 h. The reaction mixture was diluted with CH$_2$Cl$_2$ (10 mL), washed once with wafer (10 mL), and precipitated into ice-cooled i-propanol (120 mL) to yield 58 mg (30%) of copolymer as a transparent glassy solid; $M_n$=1.50×10$^3$, pdi=1.28. $^1$H NMR: 1.4-1.7; (m, CH$_3$), 2.3; (s, CH$_3$COS), 3.2-3.4; (m, CHCH$_2$S), m, 4.3-4.6; (CH$_2$CHBr), 5.1-5.2; (m CHCH$_3$). $^{13}$C NMR: 16.6; (CH$_3$), 30.0; (SCOCCH$_3$), 39.7; (CBr), 45.0; (CS), 64.5; (CH$_2$CHBr), 69.0; (CHCH$_3$), 70.0; (CH$_2$CHS), 166.5; (CHBrCO), 169.2; (C(CH$_3$)COO), 173.2; (SCO).

Example 11D

Synthesis of poly[(lactic acid)-co-(2-iodo-3-hydroxypropionic acid)-co-(2-acetylthiomethyl-2-hydroxyethanoic acid)] Starting from the Iodinated Copolymer A mixture of poly[(lactic acid)-co-(2-iodo-3-hydroxypropionic acid)] ($M_n$=8.45×10$^3$, pdi=1.41; 0.10 g, 0.22 mmol I), potassium thioacetate (22 mg, 0.22 mmol) and 18-crown-6 (10 mg, 40 µmol) in acetonitrile (1 mL) was stirred at room temperature for 48 h. The reaction mixture was diluted with CH$_2$Cl$_2$ (10 mL), washed once with water (10 mL), and precipitated into ice-cooled i-propanol (120 mL) to yield 0.13 g of copolymer as a yellow solid; $M_n$=1.70×10$^3$, pdi=1.35.

Example 11E

Synthesis of poly[(lactic acid)-co-(2-bromo-3-hydroxypropionic acid)-co-(2-azidomethyl-2-hydroxyethanoic acid)] Starting from the Isomerized Brominated Copolymer A solution of sodium azide (17 mg, 0.26 mmol) in dry DMF (15 mL) was added dropwise over 30 minutes to a solution of poly[(lactic acid)-co-(2-bromo-3-hydroxypropionic acid)-co-(2-bromomethyl-2-hydroxyethanoic acid)] ($M_n$=9.50×10$^3$, pdi=1.42; 0.20 g, 0.21 mmol CH$_2$Br) in DMF (2 mL) and stirred at room temperature for 48 h. The reaction was concentrated using a rotary evaporator and then dissolved in CH$_2$Cl$_2$ (10 mL), washed once with water (10 mL), and the organic layer was concentrated using a rotary evaporator to yield 0.11 g (58%) of copolymer as a white solid; $M_n$=3.93×10$^3$, pdi=1.86. $^1$H NMR: 1.4-1.7; (m, CH$_3$), 2.4; (m, CHCH$_2$N$_3$), 3.6-3.7; (m, CH$_2$N$_3$), m, 4.1-4.3; (m, CHCH$_2$Br), 4.3-4.6; (CHBr), 5.1-5.2; (m CHCH$_3$), 5.3-5.4; (m, CH$_2$Br). $^{13}$C NMR: 16.6; (CH$_3$), 29.0; (CHCH$_2$Br), 39.7; (CHBr), 60.0; (CHCH$_2$N$_3$), 64.4; (CH$_2$CHBr), 66.6; (CHCH$_2$N$_3$) 70.0; (CHCH$_3$), 165.5; (CHCH$_2$CO), 166.7; (CHBrCO), 169.3; (C(CH$_3$)COO).

Example 11F

Synthesis of poly[(lactic acid)-co-(2-bromo-3-hydroxypropionic acid)-co-(2-acetylthiomethyl-2-hydroxyethanoic acid)] Starting from the Isomerized Brominated Copolymer A solution of poly[(lactic acid)-co-(2-bromo-3-hydroxypropionic acid)-co-(2-bromomethyl-2-hydroxyethanoic acid)] ($M_n$=7.06×10$^3$, pdi=1.99; 0.20 g, 0.21 mmol CH$_2$Br), potassium thioacetate (23 mg, 0.20 mmol) and 18-crown-6

(8.5 mg, 32 µmol) so acetonitrile (35 ml) was stirred at room temperature (23° C.) for 48 h. The reaction mixture was concentrated on a rotary evaporator and then dissolved in $CH_2Cl_2$ (10 mL), and washed once with water (10 ml), to yield 0.27 g of copolymer as a yellow solid; $M_n=3.57\times10^3$, pdi=2.24. $^1H$ NMR: 1.4-1.7; (m, $CH_3$), 2.3; (s, $CH_3COS$), 4.3-4.8; (m, $CHCH_2S$, $CH_2CHI$), 5.1-5.2; (m $CHCH_3$). $^{13}C$ NMR: 16.6; ($CH_3$), 30.0; ($SCOCCH_3$), 45.0; (CS), 66.0; ($CH_2CHI$), 66.6; (CI), 69.0; ($CHCH_3$), 70.0; ($CH_2CHS$), 166.5; (CHBrCO), 169.2; ($C(CH_3)COO$), 173.2; (SCO).

Results and Discussion

Polyesterification:

Direct polycondensations in bulk are reversible reactions, and need extremely high extent of conversion to achieve high molecular weight. At higher conversions, the increase in the viscosity of the bulk, makes removal of the by-product, water, by heat and vacuum more and more difficult. Adding a small amount of high boiling solvent, like diphenylether (DPE), plasticizes the bulk, permitting the bulk to be dehydrated further. This shifts the equilibrium to the right, and affords higher molecular weights. The number average molecular weights obtained were around 20,000 Da, measured by GPC calibrated to polystyrene standards. However, since the different co-polymer compositions have different molecular weights, the co-polymerizations may only be compared by their degree of polymerizations. PLA had the highest DP. Upon introducing glycolic acid, the PLGA copolymers formed with lower DP. Co polymers of lactic acid with 2-bromo-3-hydroxypropionic acid also formed polymers with lower DP than that of PLA and PLGA. Increasing content of 2-bromo-3-hydroxypropionic acid led to polymers with decreasing DP. This could be attributed to the lower reactivity of 2-bromo-3-hydroxypropionic acid, as compared to LA. However, with the tri-component co-polymers of LA, GA and 2-bromo-3-hydroxypropionic acid of varying ratios, their DP was higher than the co-polymers of just LA with 2-bromo-3-hydroxypropionic acid. This could be because of the higher reactivity of GA units. The polydisperity was also higher in the tri-component co-polymers.

Reactions on the Model Compound:

(Table 2) To investigate potential reactions to functionalize the brominated polyester, a small molecule model, methyl 3-acetoxy-2-bromopropanoate, was synthesized by esterifying the carboxylic acid and the hydroxyl groups of 2-bromo-3-hydroxypropionic acid with methanol and acetyl chloride respectively. This molecule and the brominated polyester have very similar reactivity at the halogen, as the immediate electronic environment of the carbon-halogen bond in the model and the polymer is identical out to three bonds. The model molecule underwent substitution at the halogen using sodium azide, sodium iodide and sodium thioacetate as nucleophiles to prepare the azido, iodo and thioester derivatives. These reactions were fast, less than 1 hour in the case of azide, and quantitative. Highly efficient functionalization reactions are necessary for post-polymerization functionalization as bimolecular reactions with macromolecules occur much slower than those with small molecules, due to diffusion limitations, and non-reacted sites along the backbone cannot be removed post reaction.

Potassium phenoxide and potassium acetate caused a competing α-elimination reaction that makes them unsuitable for substitution. Potassium phenoxide caused 95% elimination at room temperature in less than one hour. Potassium acetate caused varying amounts of elimination, 48-80%, depending on temperature and solvent, with lower temperatures and more polar solvents favoring substitution. Even a small amount of elimination makes these nucleophiles unsuitable for polymer functionalization because the elimination results in chain-scission. (scheme 4)

α to β Halo Rearrangement:

While conducting substitution experiments using 3-methyl-4,5-dichloroimidazole, a poor nucleophile, and MABP a product was formed that did not correspond to substitution or elimination. Repeating this experiment in the absence of a nucleophile it was observed that MABP underwent a thermal rearrangement from the α-bromo isomer to a β-bromo isomer, likely via a five-member ring intermediate.

This rearrangement is supported by $^1H$ and $^{13}C$ NMR spectroscopy, which shows the emergence of resonances corresponding to the methine at 5.43 and 71.38 ppm and the methylene at 3.71 and 29.88 ppm in the $^1H$ and $^{13}C$ spectra respectively, of the β-bromo isomer.

This rearrangement mechanism is further supported by an experiment isomerizing a 6.2 kDa 58:42 poly[(lactic acid)-co-(2-bromo-3-hydroxypropionic acid)]. The polyester was heated to 105° C. in acetonitrile for 96 hours and observed to isomerize 25% with very little loss in molecular weight, as observed by a shift in GPC retention time from 39.9 to 40.9 minutes. This shift may be accounted for by a change in hydrodynamic radius due to the different repeat unit and not actual polymer degradation.

This rearrangement proceeds most efficiently upon heating in polar solvent, acetonitrile, succinonitrile or DMF. The rearrangement of the small molecule proceeded to an equilibrium concentration of 60:40 β to α, quantified by $^1$H-NMR, at 120° C. in succinonitrile in a pressure tube. This thermal rearrangement offers a possible route to orthogonal functionalization by providing two types of halogen functionality, a primary halogen, which is more susceptible to nucleophilic substitution due to reduced steric bulk at the σ* orbital, and an α-halo ester, capable of radical chemistry due to the adjacent carbonyl, in the same polyester backbone utilizing one functional monomer. Furthermore, this isomerization can be accomplished in situ during the polycondensation and the amount of each isomer repeat unit controlled by the temperature used during the polymerization. Below 95° C. almost no β-halo isomer is observed.

Reactions on the Polyester:

(Table 2) The reactions on the polyester all were ran for 48 hours at room temperature. Iodo and azide both substituted quantitatively, while the thioaceate showed substitution once the polymer had rearranged to the β halogen form. In the case of iodo substitution there was a loss of 1,000 Mn when substitution occurred. When the thioacetate substitutes onto the polymer there is a loss of 8,000 and 7,800 Da from the bromo and iodo derivatives respectively. When sodium azide substitutes onto the polymer 7,900 and 7,900 Da from the bromo and iodo derivatives respectively. Looking at the molecular weight differences the iodo polymer is better for functionalizing, which corresponds with iodine being a better leaving group then bromine.

In order to decrease the loss of molecular weight when functionalizing the polyester a partially isomerized polymer was used. By targeting the primary halide the favorability of nucleophilic substitution is increased. For the sodium azide substitution a slow dilute addition of sodium azide resulted in a % $M_n$ loss of 33% which is an improvement from 84% when the alpha bromine is targeted. The reason for this improvement is that there is a primary halide that favors $S_N2$ over $E_2$. Another reason is presumably that the polymer exists as a random coil in solution and so the bromine in the center of the coil is shielded from the azide. This causes a local concentration of azide on the outside of the polymer to be in excess of 1.0 and increases the chance of elimination. With the dilute addition the azide the excess azide at the surface of the polymer is avoided, and substitution is favored. When the partially isomerized polymer is substituted with thioacetate the % $M_n$ loss decreases from 89% to 47%. This is because the thioacetate does not have to wait for the polymer to spontaneously rearrange before ft substitutes. This limits the amount of excess thioaceate in the system and again promotes substitution over elimination.

TABLE 1

| Sample | Feed Ratio | | | GPC PSt | | | | by NMR calculation | | |
|---|---|---|---|---|---|---|---|---|---|---|
| | LA | GA | BrH | Mn | Mw | PDI | DP | LA | GA | BrH |
| PLA | 100 | 0 | 0 | $3.16 \times 10^4$ | $5.12 \times 10^4$ | 1.62 | 438.9 | 100 | 0 | 0 |
| PLGA9010 | 90 | 10 | 0 | $2.29 \times 10^4$ | $3.49 \times 10^4$ | 1.53 | 324.4 | 90.1 | 9.9 | 0 |
| PLGA8020 | 80 | 20 | 0 | $2.01 \times 10^4$ | $3.05 \times 10^4$ | 1.51 | 290.5 | 80.3 | 19.7 | 0 |
| PLBr9010 | 90 | 0 | 10 | $2.08 \times 10^4$ | $4.13 \times 10^4$ | 1.99 | 260.3 | 89.9 | 0 | 10.1 |
| PLBr8020 | 80 | 0 | 20 | $1.80 \times 10^4$ | $3.96 \times 10^4$ | 2.2 | 205.0 | 80.3 | 0 | 19.7 |
| PLBr7030 | 70 | 0 | 30 | $1.68 \times 10^4$ | $3.67 \times 10^4$ | 2.18 | 175.5 | 70.3 | 0 | 29.7 |
| PLBr6040 | 60 | 0 | 40 | $1.71 \times 10^4$ | $3.44 \times 10^4$ | 2.01 | 165.1 | 59.7 | 0 | 39.3 |
| PLBr5050 | 50 | 0 | 50 | $2.03 \times 10^4$ | $3.91 \times 10^4$ | 1.93 | 182.1 | 50 | 0 | 50 |
| PLGBr801010 | 80 | 10 | 10 | $2.99 \times 10^4$ | $7.49 \times 10^4$ | 2.51 | 380.9 | 80.1 | 10 | 9.9 |
| PLGBr701020 | 70 | 10 | 20 | $2.37 \times 10^4$ | $9.45 \times 10^4$ | 3.99 | 274.3 | 70 | 10.1 | 19.9 |
| PLGBr601030 | 60 | 10 | 30 | $2.30 \times 10^4$ | $1.00 \times 10^5$ | 4.35 | 243.9 | 60.1 | 10 | 29.9 |
| PLGBr702010 | 70 | 20 | 10 | $2.32 \times 10^4$ | $5.87 \times 10^4$ | 2.52 | 300.9 | 69.8 | 20.1 | 9.1 |
| PLGBr602020 | 60 | 20 | 20 | $2.20 \times 10^4$ | $9.10 \times 10^5$ | 4.13 | 258.9 | 59.46 | 16.29 | 24.25 |
| PLGBr502030 | 50 | 20 | 30 | $1.89 \times 10^4$ | $7.28 \times 10^5$ | 3.86 | 202.9 | 51.64 | 16.52 | 31.84 |

TABLE 2

| | Reactant | Solvent | Time | Temp | Conversion | Mn before | Mn after | pdi before | pdi after |
|---|---|---|---|---|---|---|---|---|---|
| Model | sodium iodide | Acetone | 6 h | RT | quatitative | | | | |
| | sodium azide | DMF | 45 min | RT | quatitative | | | | |
| | sodium thioacetate | Acetonitrile | 48 h | RT | re-arranged substituted | | | | |
| Brominated Polyester | sodium iodide | Acetone | 48 h | RT | quatitative | 9470 | 8450 | 1.42 | 1.41 |
| | sodium azide | DMF | 48 h | RT | quatitative | 9470 | 1560 | 1.42 | 1.71 |
| | sodium thioacetate | Acetonitrile | 48 h | RT | re-arranged substituted | 9470 | 1500 | 1.42 | 1.28 |
| Iodated Polyester | sodium azide | DMF | 48 h | RT | quatitative | 8450 | 1970 | 1.41 | 1.48 |
| | sodium thioacetate | Acetonitrile | 48 h | RT | re-arranged substituted | 8450 | 1700 | 1.41 | 1.35 |
| Partially Isomerized | sodium azide | DMF | 24 h | RT | quatitative | 5850 | 3925 | 2.11 | 1.86 |
| Brominated polyester | sodium thioacetate | Acetonitrile | 48 h | RT | re-arranged | 7060 | 3751 | 1.99 | 2.24 |

The functionalized copolyesters of the present invention have the same end uses of that of current commercial biodegradable polyesters. For example, they can be utilized to make food trays, cold drink cups, packaging applications, bottles, jars, pots, films, bags, and so forth. They also can be utilized as a feedstock for attachment of medical or drug delivery systems or compounds thereto.

While in accordance with the patent statutes the best mode and preferred embodiment have been set forth, the scope of the invention is not intended to be limited thereto, but only by the scope of the attached claims.

What is claimed is:

1. A process for synthesizing an α-halogenated copolyester comprising:

polymerizing one or more α-halogenated hydroxyacids with one or more commoners using a protonic catalyst or a Lewis acid catalyst, where the co-monomers are selected from (i) one or more diols containing from 2 to about 10 carbon atoms and one or more dicarboxylic acids containing from 2 to about 15 carbon atoms;

(ii) one or more hydroxyacids containing from 2 to about 20 carbon atoms, or (iii) one or more diols containing from 2 to about 10 carbon atoms, one or more dicarboxylic acids containing from 2 to about 15 carbon atoms, and one or more hydroxyacids containing from 2 to about 20 carbon atoms;

wherein the amount of the total α-halogenated hydroxyacid is from about 30 to about 80 mole % based upon the total number of moles of the α-halogenated hydroxyacid and the co-monomers.

2. The process of claim 1, wherein at least one of the co-monomers is a hydroxyacid selected from glycolic acid, galactaric acid, hydroxypropionic acid, lactic acid, hydroxybutyric acid, hydroxyisobutyric acid, hydroxy methylbutyric acid, bis(hydroxymethyl)propionic acid, hydroxyoctadecanoic acid, di-tert-butyl hydroxybenzoic acid, benzilic acid, hydroxyl fluorenecarboxylic acid, hydroxydecanoic acid, hydroxynaphthalenecarboxylic acid, hydroxybenzenedicarboxylic acid, hydroxymethylbenzoic acid, hydroxyphenylacetic acid, mandelic acid, hydroxymethoxybenzoic acid, methoxy salicylic acid, hydroxyoctanoic acid, hydroxycinnamic acid, dihydroxycinnamic acid, dihydroxyhydrocinnamic acid, hydroxyphenylpropionic acid, dihydroxytartaric acid, hydroxymethoxycinnamic acid, salicylic acid, citrazinic acid, galacturonic acid, glucuronic acid, hydroxypropanedioic acid, hydroxyphenyl propionic acid, methoxy salicylic acid, tartaric acid or trihydroxybenzoic acid and combinations thereof.

3. The process of claim 1, wherein the co-monomer is selected from lactic acid, glycolic acid, and a combination thereof.

4. The process of claim 1, wherein the number average molecular weight of the α-halogenated copolyester is from about 2,000 Da to about 40,000 Da.

5. The process of claim 1, wherein one or more of the α-halogenated hydroxyacids is a 2-halo-3-hydroxypropionic acid.

6. The process of claim 1, wherein the 2-halo-3-hydroxypropionic acid is 2-bromo-3-hydroxypropionic acid or 2-chloro-3-hydroxypropionic acid.

7. The process of claim 1, wherein the step of polymerizing employs a catalyst selected from p-dimethylaminopyridinium toluenesulphonate (DPTS), p-toluidine hydrochloride, dimethyl-p-phenylenediamine dihydrochloride, p-toluenesulphonic acid, or $SnCl_2$, and combinations thereof.

8. The process of claim 1, wherein the process further comprises reacting the α-halogenated copolyester with a linking agent and a protonic catalyst or a Lewis acid catalyst.

9. The process of claim 1, wherein the α-halogenated copolyester includes an α-halogenated ester, and the process further comprises isomerizing the α-halogenated ester to a β-halogenated ester.

10. The process of claim 1, wherein the α-halogenated copolyester includes an α-halogenated ester, and the process further comprises reacting the halogen atom of the α-halogenated ester with an amine group.

11. The process of claim 1, wherein the α-halogenated copolyester includes an α-halogenated ester, and the process further comprises reacting the halogen atom of the α-halogenated ester with an iodo group, an azide group, or a thioacetate group.

12. The process of claim 1, wherein the step of polymerizing is performed as a bulk process.

13. The process of claim 1, wherein the step of polymerizing is performed under vacuum.

14. A process of functionalizing a copolyester comprising:
replacing an α-halogen atom of an α-halogenated copolyester with a functional group; wherein α-halogenated copolyester comprises:
repeat units derived one or more α-halogenated hydroxyacids, and repeat units derived from co-monomers that include:
 (i) one or more diols containing from 2 to about 10 carbon atoms and one or more dicarboxylic acids containing from 2 to about 15 carbon atoms;
 (ii) one or more hydroxyacids containing from 2 to about 20 carbon atoms, or
 (iii) one or more diols containing from 2 to about 10 carbon atoms, one or more dicarboxylic acids containing from 2 to about 15 carbon atoms, and one or more hydroxyacids containing from 2 to about 20 carbon atoms;
where the step of replacing is performed by reacting the α-halogenated ester with an amine group, iodo group, an azide group, or a thioacetate group.

15. The process of claim 14, wherein the step of replacing is performed by reacting the α-halogenated ester with an amine group.

16. The process of claim 14, wherein the step of replacing is performed by reacting the α-halogenated ester with an iodo group.

17. The process of claim 14, wherein the step of replacing is performed by reacting the α-halogenated ester with an azide group.

18. The process of claim 14, wherein the step of replacing is performed by reacting the α-halogenated ester with a thioacetate group.

19. A process for synthesizing an α-halogenated copolyester comprising:
polymerizing one or more α-halogenated hydroxyacids with one or more commoners using a catalyst selected from p-dimethylaminopyridinium toluenesulphonate (DPTS), p-toluidine hydrochloride, dimethyl-p-phenylenediamine dihydrochloride, p-toluenesulphonic acid, or $SnCl_2$, and combinations thereof,
where the co-monomers are selected from
 (i) one or more diols containing from 2 to about 10 carbon atoms and one or more dicarboxylic acids containing from 2 to about 15 carbon atoms;
 (ii) one or more hydroxyacids containing from 2 to about 20 carbon atoms, or
 (iii) one or more diols containing from 2 to about 10 carbon atoms, one or more dicarboxylic acids containing from 2 to about 15 carbon atoms, and one or more hydroxyacids containing from 2 to about 20 carbon atoms.

20. A process for synthesizing an α-halogenated copolyester comprising:
polymerizing one or more α-halogenated hydroxyacids with one or more commoners using a protonic catalyst or a Lewis acid catalyst to form an α-halogenated copolyester, where the co-monomers are selected from
 (i) one or more diols containing from 2 to about 10 carbon atoms and one or more dicarboxylic acids containing from 2 to about 15 carbon atoms;
 (ii) one or more hydroxyacids containing from 2 to about 20 carbon atoms, or
 (iii) one or more diols containing from 2 to about 10 carbon atoms, one or more dicarboxylic acids containing from 2 to about 15 carbon atoms, and one or more hydroxyacids containing from 2 to about 20 carbon atoms; and
reacting the α-halogenated copolyester with a linking agent and a protonic catalyst or a Lewis acid catalyst.

21. A process for synthesizing an α-halogenated copolyester comprising:
polymerizing one or more α-halogenated hydroxyacids with one or more commoners using a protonic catalyst or a Lewis acid catalyst to form an α-halogenated copolyester, where the co-monomers are selected from
 (i) one or more diols containing from 2 to about 10 carbon atoms and one or more dicarboxylic acids containing from 2 to about 15 carbon atoms;
 (ii) one or more hydroxyacids containing from 2 to about 20 carbon atoms, or (iii) one or more diols containing from 2 to about 10 carbon atoms, one or more dicarboxylic acids containing from 2 to about 15 carbon atoms, and one or more hydroxyacids containing from 2 to about 20 carbon atoms; and isomerizing the α-halogenated ester to a O-halogenated ester.

22. A process for synthesizing an α-halogenated copolyester comprising:

polymerizing one or more α-halogenated hydroxyacids with one or more commoners using a protonic catalyst or a Lewis acid catalyst to form an α-halogenated copolyester, where the co-monomers are selected from
  (i) one or more diols containing from 2 to about 10 carbon atoms and one or more dicarboxylic acids containing from 2 to about 15 carbon atoms;
  (ii) one or more hydroxyacids containing from 2 to about 20 carbon atoms, or
  (iii) one or more diols containing from 2 to about 10 carbon atoms, one or more dicarboxylic acids containing from 2 to about 15 carbon atoms, and one or more hydroxyacids containing from 2 to about 20 carbon atoms; and reacting the halogen atom of the α-halogenated ester with an amine group.

* * * * *